United States Patent
Henkel et al.

(10) Patent No.: US 6,869,226 B2
(45) Date of Patent: Mar. 22, 2005

(54) DRIVE TRAIN OF A MOTOR VEHICLE AND METHOD OF MAKING A BEARING UNIT

(75) Inventors: Juergen Henkel, Kernen (DE); Thomas Keller, Fellbach (DE); Andreas Kollmann, Waldachtal (DE); Dietmar Rill, Ebersbach (DE); Rolf Schroeder, Stuttgart (DE); Guenter Woerner, Kernen (DE)

(73) Assignee: DaimlerChrysler AG, Stuttgart (DE)

( * ) Notice: Subject to any disclaimer, the term of this patent is extended or adjusted under 35 U.S.C. 154(b) by 89 days.

(21) Appl. No.: 10/391,526

(22) Filed: Mar. 19, 2003

(65) Prior Publication Data

US 2004/0011584 A1 Jan. 22, 2004

(30) Foreign Application Priority Data

Mar. 20, 2002 (DE) ......................................... 102 12 474

(51) Int. Cl.[7] ........................ F16C 27/06; B60K 17/24
(52) U.S. Cl. ...................................... 384/536; 180/381
(58) Field of Search .......................... 384/99, 535, 536, 384/581, 582; 180/381

(56) References Cited

U.S. PATENT DOCUMENTS

| 2,893,790 A | * | 7/1959 | Raes et al. ................ 384/536 |
| 3,961,829 A | * | 6/1976 | Bowen et al. .............. 384/536 |
| 4,403,812 A | * | 9/1983 | Stephan ..................... 384/536 |
| 4,421,187 A | | 12/1983 | Shibata et al. ............. 180/297 |
| 4,639,150 A | | 1/1987 | Habermann ................ 384/536 |
| 4,648,475 A | * | 3/1987 | Veglia ....................... 180/381 |
| 4,796,722 A | * | 1/1989 | Kumagai ................... 180/381 |
| 4,971,456 A | | 11/1990 | Hori ............................ 384/99 |
| 5,295,744 A | * | 3/1994 | Petrzelka et al. .......... 384/536 |

FOREIGN PATENT DOCUMENTS

| DE | 3511480 | 6/1986 |
| DE | 3933515 | 5/1990 |
| DE | 3908965 | 9/1990 |
| DE | 3911914 | 10/1990 |
| DE | 19809528 | 9/1998 |
| DE | 19755307 | 2/1999 |

* cited by examiner

Primary Examiner—Thomas R. Hannon
(74) Attorney, Agent, or Firm—Crowell & Moring LLP

(57) ABSTRACT

A drive train of a motor vehicle includes a power divider, a side shaft, a constant-velocity joint, an intermediate shaft, and a bearing unit. The intermediate shaft has first and second ends. The first end of the intermediate shaft is rotatably connected to the power divider and is mounted in the power divider with a first bearing, and the second end is located opposite the power divider and is connected to the side shaft via the constant-velocity joint. The bearing unit provides further mounting for the intermediate shaft between the first bearing and the constant-velocity joint. The bearing unit has a play oriented radially with respect to the intermediate shaft, and is able to exert a force oriented radially to the intermediate shaft on the intermediate shaft only after the play has been overcome.

22 Claims, 3 Drawing Sheets

DRIVE TRAIN OF A MOTOR VEHICLE AND METHOD OF MAKING A BEARING UNIT

This application claims the priority of Federal Republic of Germany Patent Document No. 102 12 474.4-12, filed Mar. 20, 2002, the disclosure of which is expressly incorporated by reference herein.

BACKGROUND AND SUMMARY OF THE INVENTION

The invention relates to the drive train of a motor vehicle, with an intermediate shaft arranged between a power divider and a side shaft. The invention relates, furthermore, to a method of making a bearing unit for the mounting of a drive shaft of a motor vehicle.

U.S. Pat. No. 4,421,187 describes a drive train of a motor vehicle that includes an intermediate shaft which is interposed between an output bevel gear of a power divider or differential and an axle shaft or side shaft pivotable by means of a compression of the vehicle wheels. In the end region facing the output bevel gear, the intermediate shaft is mounted in the power divider by means of a first bearing. In the end region located opposite the power divider, the intermediate shaft is connected to the side shaft via a constant-velocity joint. The intermediate shaft is further mounted between the first bearing and the constant-velocity joint by means of a bearing unit which, for example, is supported likewise within the power divider or with respect to an engine block.

The mountings of the intermediate shaft are under high mechanical stresses as a result of high effective moments. Due to the connection to the power divider and to the side shaft via the constant-velocity joint, the drive shaft is exposed, in particular, to vibration excitations, for example as a result of a play of the constant-velocity joint. Equally, vibrations of the engine block or transmission block are transmitted to the intermediate shaft via the mountings. To avoid disturbances or impairments in the functioning of components of the drive train and of further components connected thereto, and to achieve a high degree of comfort, the intermediate shaft must be guided radially and axially with the necessary precision. At the same time, undesirable bearing forces should not be introduced into the body by the mountings, since such bearing forces are detrimental to driving comfort or cause sound radiation.

DE 39 11 914 C2 discloses a rolling-bearing arrangement for general uses, in which a flexurally elastic bearing outer ring is guided in one direction in a groove for radial displacements and, in a direction perpendicular to the above-mentioned direction, has a play with respect to a bearing housing. DE 197 55 307 discloses a rolling-bearing arrangement for a drive shaft of a motor vehicle, the rolling-bearing arrangement having different rigidities for different load directions in the bearing plane.

DE 39 33 515 C2 discloses an elastic intermediate mounting for a cardan shaft with a fluid filling for flexible mounting. With this intermediate mounting, vibrations with high amplitude and low frequency and with low amplitude and high frequency are damped.

DE 198 09 528 A1 discloses a vibration-reduced shaft bearing for a drive shaft of a differential, by means of which shaft bearing noises caused by bearing play are reduced.

Furthermore, DE 35 11 480 C1 discloses an intermediate bearing for an articulated shaft of motor vehicles. In the intermediate bearing, an elastic intermediate layer, which receives a bearing outer ring, is positioned, free of play, as a result of prestress by means of projections.

DE 39 08 965 A1 discloses a cardan-shaft bearing with an outer and an inner ring which together delimit a gap extending in the axial direction and are supported radially elastically one on the other by a rubber intermediate ring.

An object of the present invention is to propose a drive train with improved mechanical transmission behavior. Another object of the invention is to propose an improved method of making a bearing unit for the mounting of a drive shaft of a motor vehicle.

The objects of the invention are achieved by the invention described and claimed hereinafter. The bearing unit of the present invention has a play oriented radially to the intermediate shaft. As a result, the bearing unit exerts radial forces on the intermediate shaft only after the play has been overcome. At the same time, this means that forces can be transferred in the direction of the body in the radial direction and, conversely, in the direction from the engine to the side shaft only when the play is overcome. As a result, an improvement in comfort and a reduction in sound radiation can be achieved.

The play extends over parts or large parts of the circumference. The invention follows a different path from the customary principle of providing a rotating shaft acted upon by high moments with a fixed mounting and a loose mounting. Instead, for small deflections, the shaft is mounted solely by the bearing arranged adjacently to the output bevel gear of the power divider and is coupled to the side shaft via the constant-velocity joint. Contrary to the usual principle, according to the invention, the basis, in the radial direction, is a self-centering of the intermediate shaft as a result of the one-sided mounting of the first bearing, as a result of the coupling to the side shaft and as a result of the stabilization of the rotational movement of the intermediate shaft by torsion stabilization. The second bearing unit equipped with the play thus serves merely as a "take-up solution" for deflections of the intermediate shaft which exceed the minimum amount.

As a result of the radial play, when radial accelerations occur there is a (highly) non-linear (springing and/or damping) behavior with low or insignificant rigidity or damping during the overcoming of the radial play and with an abrupt increase in rigidity or damping for a closed-up radial play. As a result of the non-linear rigidity, with periodic excitation being assumed, non-linear effects may arise, for example subharmonic and/or superharmonic vibrations or chaotic vibrations. The result of this is that the vibration excitation not only results in a vibration response with one excitation frequency with high amplitude, but the energy is also apportioned to a plurality of frequencies with a lower amplitude.

In particular, as a result of the play, the vibrations of the drive shaft which occur are transmitted, filtered according to frequency components, to the bearing unit. On the assumption of vibrations with identical energy, the amplitude for low frequencies is higher than the amplitude for high frequencies. For example, the extent of the play is dimensioned such that, for vibrations with high frequencies, the low amplitude lies within the play, so that high-frequency vibrations remain unaffected by the bearing unit and the vibrations are not transmitted to the body of the vehicle via the bearing unit. In particular, the mounting is adapted to the vibrations having low frequencies.

Preferably, the bearing unit has a bearing, a bearing carrier and an elastic intermediate layer arranged between the bearing carrier and the bearing. The radial play is provided in the force flux between the bearing and the bearing carrier.

According to a preferred embodiment of the invention, the intermediate layer has projections which point radially outwards. The projections ensure a form-locking securing of the position of the intermediate layer with respect to the bearing carrier in the axial direction and/or in the circumferential direction. Accordingly, despite the fact that rigidity in the radial direction disappears as a result of the play, for low displacements the drive shaft can be guided in the axial direction and/or circumferential direction by the projections (even when there is freedom from play). The selection of rigidity for the projections and consequently for the abovementioned directions may be made independently of the rigidity of the bearing unit in the radial direction, with the result that the possibilities for influencing the dynamics of the bearing unit are increased.

According to an aspect of the invention, in a first method step for the making of a bearing unit with an elastic intermediate layer introduced into a bearing carrier, the intermediate layer is vulcanized into or onto the bearing carrier. In such an introduction into the bearing carrier, a connection to an (inner) bearing ring can be made simultaneously with the vulcanization. After the first method step, the intermediate layer is detached from the bearing carrier in a second method step, with the result that the play in the form of a circumferential gap is formed between the intermediate layer and the bearing carrier. Detachment takes place by a cooling of at least the intermediate layer. Due to the cooling, a thermal shrinkage of the intermediate layer is obtained. In this case, it is advantageous if the coefficient of thermal expansion of the intermediate layer is higher than the coefficient of thermal expansion of the bearing carrier. According to the invention, an exactly defined gap can be produced in a particularly simple way, without, for example, (highly accurate) manufacturing steps, remachining steps or (narrow) tolerances being necessary. The play size or gap height may in this case be predetermined by the selection of the temperatures or temperature changes and of the coefficients of thermal expansion of the intermediate layer and of the bearing carrier.

Preferably, the first method step is preceded by a pretreatment of the bearing carrier in order to ensure a subsequent detachment of the intermediate layer from the bearing carrier. This pretreatment may involve, for example, the application of a releasable layer or of a grease layer to the bearing carrier.

Other objects, advantages and novel features of the present invention will become apparent from the following detailed description of the invention when considered in conjunction with the accompanying drawings.

BRIEF DESCRIPTION OF THE DRAWINGS

A preferred exemplary embodiment of the invention is explained below with reference to the drawing, in which.

DETAILED DESCRIPTION OF THE DRAWINGS

Figure 1:
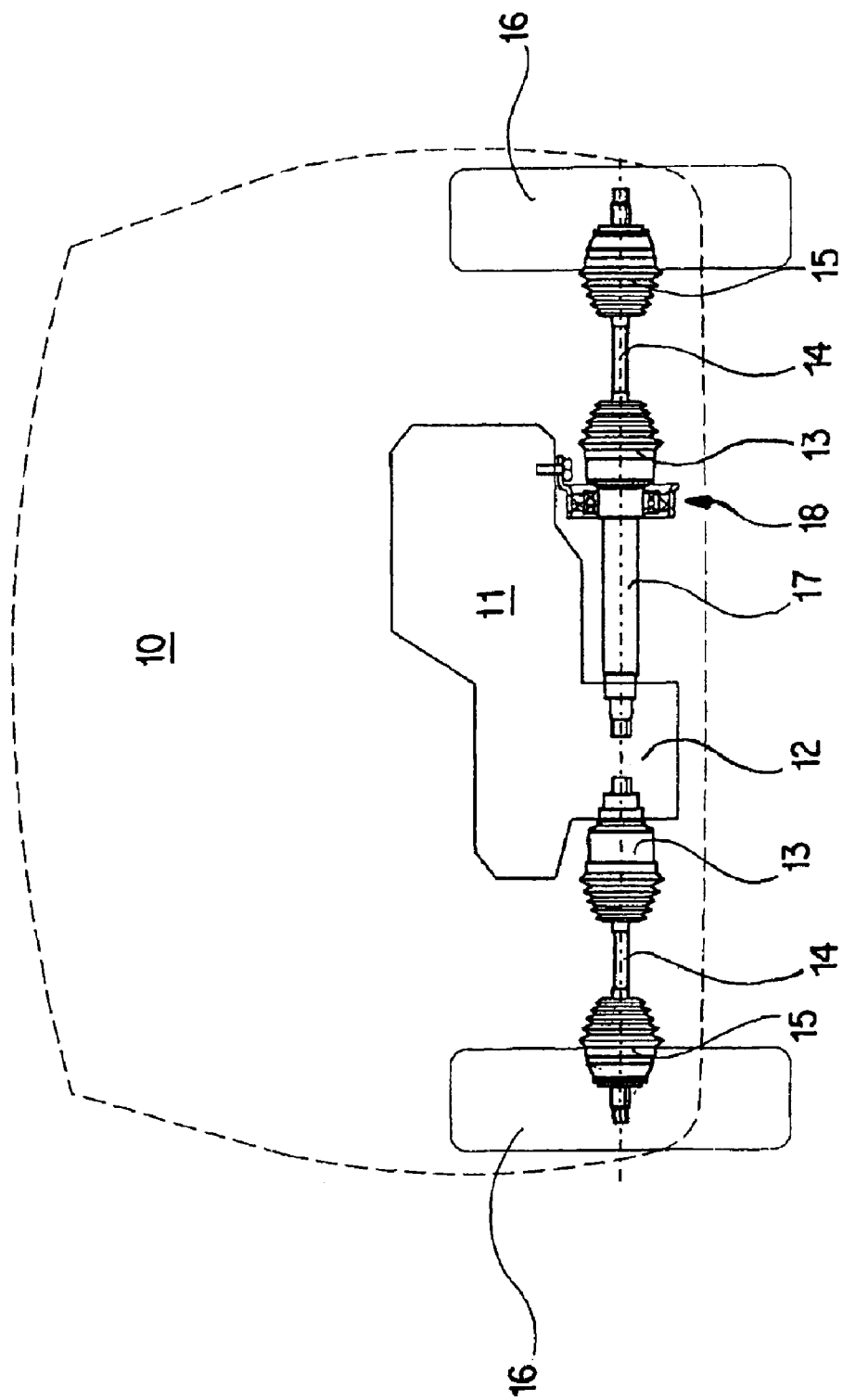
FIG. 1 shows a drive train according to the invention.

In an exemplary embodiment illustrated in FIG. 1, the invention is used in a motor vehicle 10 with a front-wheel drive and with a transversely installed engine. A drive unit 11 has an internal combustion engine and a transmission with a power divider 12, such as a following or integrated power divider or axle differential gear or differential. With the power divider 12, a drive torque is distributed to each vehicle wheel 16 via a constant-velocity joint 13, a side shaft 14 and a further constant-velocity joint 15. The force flux takes place in the abovementioned order. The power divider 12 is not located in the middle of the vehicle, so that, without an intermediate shaft 17, the side shafts 14 would have different lengths, resulting in different angular positions of the side shafts 14 for a compression of the vehicle wheels 16. For balancing, therefore, the intermediate shaft 17 is interposed between one side shaft 14 and the power divider 12. In the event of compression, identical angular positions of the side shafts 14 are obtained. This has the advantage that the disturbing forces and moments occurring at the side shafts (essentially) cancel one another out.

The intermediate shaft 17 is connected to an output bevel gear of the power divider 12 and is mounted rotatably in one end region in the power divider 12, for example, via a cylindrical or tapered-roller mounting as a fixed or loose bearing. In the end region facing away from the power divider 12, the intermediate shaft 17 is connected to the constant-velocity joint 13. Between the constant-velocity joint 13 and the power divider 12, the intermediate shaft 10 is supported outside the power divider 12, via a bearing unit 18, on the drive unit 11, in particular on the internal combustion engine. For example, the bearing unit 18 is flanged onto the internal combustion engine.

Figure 2:
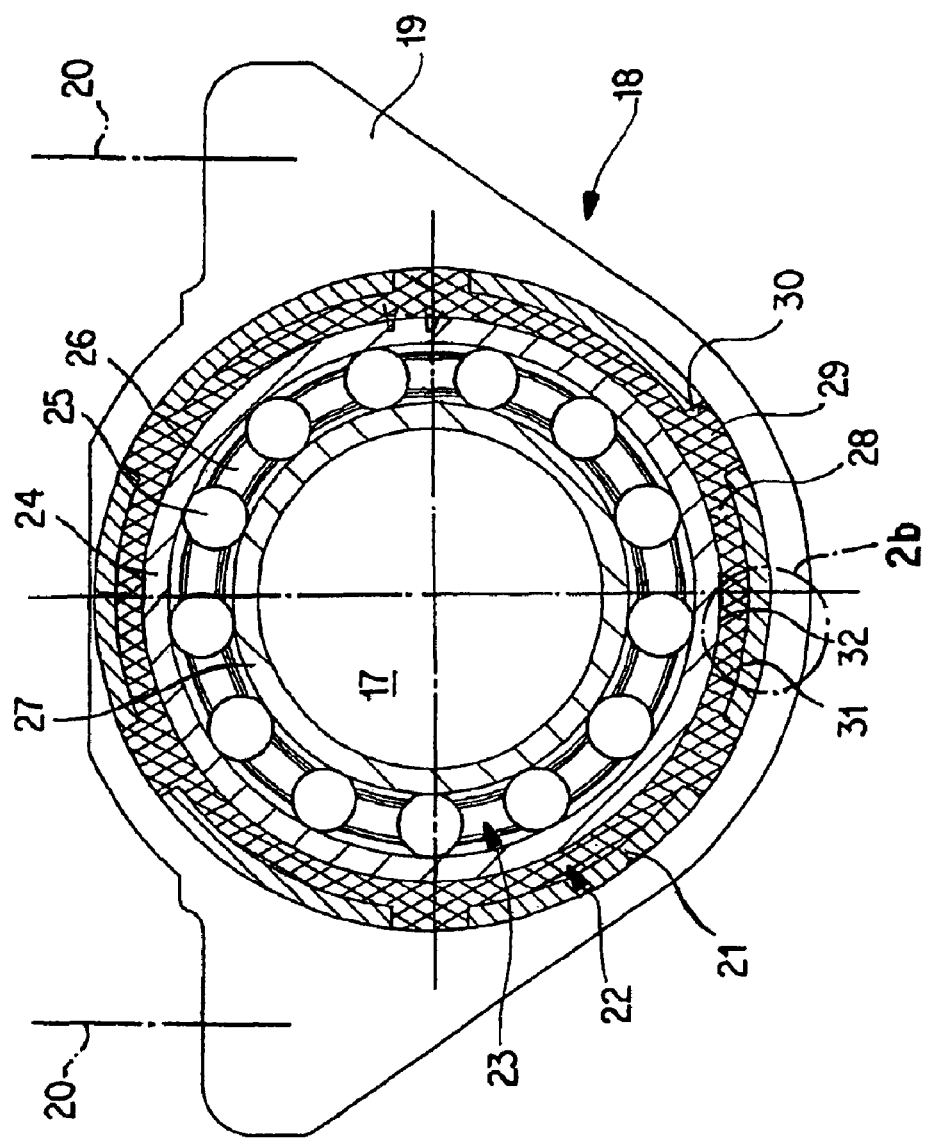
FIG. 2 shows a sectional illustration of a bearing unit of the drive train according to FIG. 1.

As shown in FIG. 2, the bearing unit 18 has a bearing carrier 21 and a holding device 19, by which the bearing unit 18 is fastened releasably to the internal combustion engine via connecting elements 20. An intermediate layer 22 is interposed between the bearing carrier 21 and the intermediate shaft 17. The intermediate layer 22 surrounds a bearing 23. In the present exemplary embodiment, the bearing carrier 21 and the holding device 19 are produced in one piece with one another.

The bearing 23 may be formed by the outer surface of the intermediate shaft 17 or by a hollow cylinder surrounding the intermediate shaft 17. In the exemplary embodiment illustrated in FIG. 2, the bearing 23 is formed by a rolling bearing which has an outer ring 24, a plurality of rolling bodies 25, a bearing cage 26 and an inner ring 27. The inner ring 27 is supported on the intermediate shaft 17, whilst the outer ring 24 is surrounded by the intermediate layer 22.

The intermediate layer 22 has a hollow-cylindrical basic body 28 and projections 29 projecting radially outwards from the basic body 28. The projections 29 are received in recesses 30 of the bearing carrier 21 in a form-locking manner perpendicularly to the drawing plane of FIG. 2 (axial direction) and/or in the circumferential direction of the intermediate shaft 17. The projections 29 are preferably designed cylindrically in the radial direction, with corresponding recesses 30 in the form of (passage) bores. According to the exemplary embodiment illustrated in FIG. 2, six projections 29 distributed uniformly over the circumference are used. Alternatively, any desired number of projections distributed uniformly or non-uniformly over the circumference may be used. A non-linear rigidity can be formed in the axial direction and/or circumferential direction via a conicity of the projections. The intermediate layer 22 is made from an elastic material, in particular plastic or rubber. According to the exemplary embodiment illustrated in FIG. 2, the basic body 28 and the projections 29 are produced in one piece or are formed from a plurality of constituents of identical or different materials. For example, the projections 29 may pass through the basic body 28 in suitable recesses as far as the bearing 23.

Figure 3:
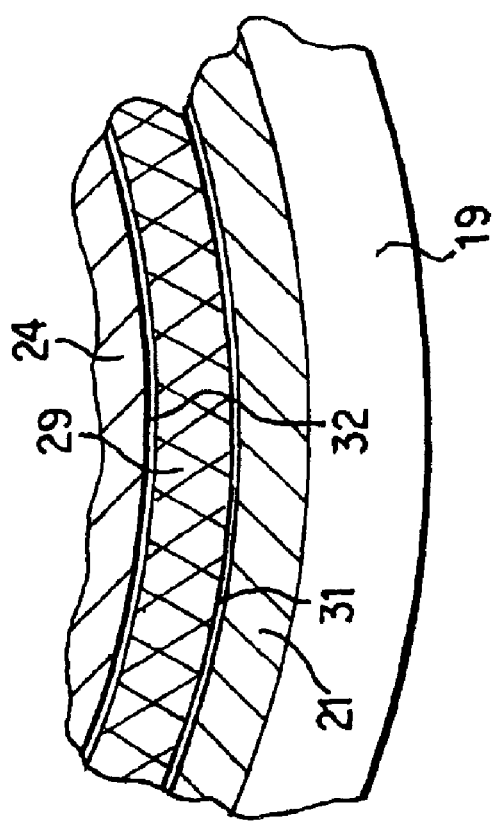
FIG. 3 is a partial sectional view of the bearing unit showing bearing plays.

As shown in FIG. 3, a radial play 31 is formed between the outer surface of the basic body 28 and the inner surface of the bearing carrier 21 in the non-loaded state of the bearing unit 18, in such a way that a hollow-cylindrical interspace is obtained. In the interspace, only the projections passing through the interspace are arranged. Alternatively or additionally, as shown in FIG. 3, a play 32 may be formed between the inner surface of the basic body 28 and the outer surface of the bearing 23.

The intermediate layer 22 is preferably vulcanized into the interspace formed between the bearing ring 23 and the bearing carrier 21. As a result of a cooling of the intermediate layer 22, there is a shrinkage of the intermediate layer 22, for example by five per cent by volume, and the formation of the radial gap 31 occurs. At the same time, the intermediate layer 22 is detached from the (suitably pretreated) bearing carrier 21, whereas the intermediate layer 22 is vulcanized firmly onto the bearing 23.

Contrary to this, the intermediate layer 22, in particular its basic body 28, may be vulcanized on to the (demounted) bearing 23. The projections 29 are then vulcanized on the basic body 28 (in the mounted or demounted state). Subsequent mounting may take place by the projections 29 being pressed radially. In particular, a material with a rigidity differing from the rigidity of the basic body is used for the projections.

Alternatively or additionally, projections of the intermediate layer 22 which are oriented radially inwards may be received in suitable recesses of the bearing 23.

When the gap 31, 32 with a constant gap height over the circumference is formed, a springing and/or damping characteristic which is (approximately) identical in all the radial directions is obtained. By contrast, with a varying gap height, a desired different springing and/or damping behavior, for example in the direction of the vehicle transverse axis and the vehicle vertical axis, may be achieved.

Alternatively, the bearing unit 18 according to the invention may also be used within a power divider 12 as a second mounting of an intermediate shaft 17.

An (insignificant) rigidity or damping of the bearing unit 18 in the radial direction may be obtained when the projections 29 come to bear in the recesses 30 of the bearing carrier 21, so as to form a contact force. As a result, elastic deformations of the projections in the radial direction occur. It may be particularly advantageous, in this case, if, during a radial movement of the intermediate shaft 17, a sticking/sliding frictional contact occurs in the contact region between the projections 29 and the recesses 30, since the friction can ensure particularly good vibration damping, as compared with a linear damper. The normal force in frictional contact can be predetermined by the stipulation of the oversize of the projections 29 in the recesses 30.

Without departing from the fundamental idea on which the invention is based, the play 31, 32 or the circumferential gap may be replaced by a material layer, the rigidity of which is very much lower than that of the intermediate layer.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A drive train of a motor vehicle comprising:
   a power divider;
   a side shaft;
   a constant-velocity joint;
   an intermediate shaft having first and second ends, wherein the first end of the intermediate shaft is rotatably connected to the power divider and is mounted in the power divider with a first bearing, and wherein the second end is located opposite the power divider and is connected to the side shaft via the constant-velocity joint; and
   a bearing unit providing further mounting for the intermediate shaft between the first bearing and the constant-velocity joint, wherein the bearing unit has a play oriented radially with respect to the intermediate shaft, and wherein the bearing unit is able to exert a force oriented radially to the intermediate shaft on the intermediate shaft only after the play has been overcome.

2. The drive train according to claim 1, wherein the coefficient of thermal expansion of the intermediate layer is higher than the coefficient of thermal expansion of the bearing carrier.

3. The drive train according to claim 1, wherein the bearing unit is supported on an engine block or transmission block.

4. A method of making a bearing unit for mounting an intermediate shaft of a motor vehicle with an elastic intermediate layer introduced into a bearing carrier for a drive train according to claim 1, the method comprising the steps of:
   vulcanising the intermediate layer into or onto the bearing carrier, and,
   detaching the intermediate layer from the bearing carrier by cooling at least the intermediate layer and by a thermal shrinkage of the intermediate layer induced by the cooling, with the result that a circumferential gap with play is achieved between the intermediate layer and the bearing carrier.

5. The method according to claim 4,
pretreating the bearing carrier in order to ensure a detachment of the intermediate layer from the bearing carrier.

6. The drive train according to claim 1,
wherein the bearing unit includes a bearing, a bearing carrier and an elastic intermediate layer arranged between the bearing carrier and the bearing, the play being formed between the intermediate layer and at least one of the bearing and the bearing carrier.

7. The drive train according to claim 6,
wherein the coefficient of thermal expansion of the intermediate layer is higher than the coefficient of thermal expansion of the bearing carrier.

8. The drive train according to claim 6,
wherein the bearing unit is supported on an engine block or transmission block.

9. A method of making a bearing unit for mounting an intermediate shaft of a motor vehicle with an elastic intermediate layer introduced into a bearing carrier for a drive train according to claim the method comprising the steps of:
   vulcanising the intermediate layer into or onto the bearing carrier, and,
   detaching the intermediate layer from the bearing carrier by cooling at least the intermediate layer and by a thermal shrinkage of the intermediate layer induced by the cooling, with the result that a circumferential gap with play is achieved between the intermediate layer and the bearing carrier.

10. The method according to claim 9,
pretreating the bearing carrier in order to ensure a detachment of the intermediate layer from the bearing carrier.

11. The drive train according to claim 6,
wherein the intermediate layer is connected firmly to the bearing, and the play is provided between the intermediate layer and the bearing carrier.

12. The drive train according to claim 11,
wherein the coefficient of thermal expansion of the intermediate layer is higher than the coefficient of thermal expansion of the bearing carrier.

13. The drive train according to claim 11,
wherein the bearing unit is supported on an engine block or transmission block.

14. A method of making a bearing unit for mounting an intermediate shaft of a motor vehicle with an elastic intermediate layer introduced into a bearing carrier for a drive train according to claim 11, the method comprising the steps of:
vulcanising the intermediate layer into or onto the bearing carrier, and,
detaching the intermediate layer from the bearing carrier by cooling at least the intermediate layer and by a thermal shrinkage of the intermediate layer induced by the cooling, with the result that a circumferential gap with play is achieved between the intermediate layer and the bearing carrier.

15. The method according to claim 14,
pretreating the bearing carrier in order to ensure a detachment of the intermediate layer from the bearing carrier.

16. The drive train according to claim 11,
wherein the intermediate layer includes radial projections to ensure a form-locking securing of the intermediate layer with respect to the bearing carrier in at least one of the axial direction and the circumferential direction.

17. The drive train according to claim 16,
wherein the coefficient of thermal expansion of the intermediate layer is higher than the coefficient of thermal expansion of the bearing carrier.

18. The drive train according to claim 16,
wherein the bearing unit is supported on an engine block or transmission block.

19. A method of making a bearing unit for mounting an intermediate shaft of a motor vehicle with an elastic intermediate layer introduced into a bearing carrier for a drive train according to claim 16, the method comprising the steps of:
vulcanising the intermediate layer into or onto the bearing carrier, and,
detaching the intermediate layer from the bearing carrier by cooling at least the intermediate layer and by a thermal shrinkage of the intermediate layer induced by the cooling, with the result that a circumferential gap with play is achieved between the intermediate layer and the bearing carrier.

20. The method according to claim 19,
pretreating the bearing carrier in order to ensure a detachment of the intermediate layer from the bearing carrier.

21. The drive train according to claim 16,
wherein the bearing carrier includes recesses, and the projections are received in the recesses of the bearing carrier.

22. The drive train according to claim 21,
wherein the bearing carrier includes bores, and the projections have a circular cross section and are received in the bores of the bearing carrier.

* * * * *